(12) United States Patent
Rajala et al.

(10) Patent No.: US 7,003,729 B1
(45) Date of Patent: Feb. 21, 2006

(54) METHOD AND APPARATUS FOR SUPPORTING MULTIPLE ALTERNATIVE GRAPHICAL USER INTERFACES IN COMPUTER-MODERATED ELECTRONIC COMMERCE

(75) Inventors: Harri Rajala, Pori (FI); Sami Lahti, Noormarkku (FI); Tapani Rautavirta, Ulvila (FI); Samu Lahti, Pori (FI); Markus Salmi, Tampere (FI)

(73) Assignee: i2 Technologies US, Inc., Dallas, TX (US)

( * ) Notice: Subject to any disclaimer, the term of this patent is extended or adjusted under 35 U.S.C. 154(b) by 563 days.

(21) Appl. No.: 09/551,899

(22) Filed: Apr. 19, 2000

Related U.S. Application Data

(60) Provisional application No. 60/130,735, filed on Apr. 20, 1999.

(51) Int. Cl.
*G06F 3/00* (2006.01)
*G06F 9/00* (2006.01)
*G06F 17/00* (2006.01)
*G06F 15/16* (2006.01)
*G06F 17/60* (2006.01)

(52) U.S. Cl. .................. 715/762; 715/809; 715/962; 709/201; 705/26

(58) Field of Classification Search ............... 345/966, 345/965, 860, 750, 748, 726, 710, 703, 716, 345/719, 744, 962, 762, 763, 749, 760, 765; 705/70, 16, 26; 715/762, 809
See application file for complete search history.

(56) References Cited

U.S. PATENT DOCUMENTS

| 5,535,321 | A | * | 7/1996 | Massaro et al. | 395/155 |
| 5,710,887 | A | * | 1/1998 | Chelliah et al. | 395/226 |
| 6,104,392 | A | * | 8/2000 | Shaw et al. | 345/749 |
| 6,330,007 | B1 | * | 12/2001 | Isreal et al. | 345/762 |
| 6,429,882 | B1 | * | 8/2002 | Abdelnur et al. | 345/763 |
| 6,460,042 | B1 | * | 10/2002 | Hitchcock et al. | 707/100 |
| 2002/0054085 | A1 | * | 5/2002 | Taylor et al. | 345/744 |

FOREIGN PATENT DOCUMENTS

| EP | 0 367 709 A1 | 10/1989 |
| EP | 0 442 676 A2 | 2/1991 |
| WO | WO 99/09658 | 2/1999 |

OTHER PUBLICATIONS

Unknown, "Using Mainframe Host Panel Source to Produce Graphic User Interface Panel Dynamically," IBM® Technical Disclosure Bulletin, Amonk, NY, vol. 37, No. 8, 1 page, Aug. 1994.

PCT, Notification of Transmittal of the International Search Report or the Declaration, 8 pages, Dec. 20, 2001.

* cited by examiner

*Primary Examiner*—John Cabeca
*Assistant Examiner*—Namitha Pillai
(74) *Attorney, Agent, or Firm*—James E. Walton; Brian E. Harris

(57) ABSTRACT

A system and method supports multiple alternative graphical user interfaces in computer-moderated electronic commerce. A single database system provides information necessary for standard graphical user interface display by different display engines. The information which is supplied to generate user interface objects is formatted to support low bandwidth graphical user interfaces. In particular, formatting is selected so that low bandwidth HTML engines render a user interface similar to that displayed by higher bandwidth engines.

16 Claims, 16 Drawing Sheets

| PROPERTY | VALUE |
|---|---|
| CLASS | CANNOT BE EDITED. |
| X | DISPLAYS THE X COORDINATE OF THE CONTROL IN PIXELS. |
| Y | DISPLAYS THE Y COORDINATE OF THE CONTROL IN PIXELS. |
| W | DISPLAYS THE WIDTH OF THE CONTROL IN PIXELS. |
| H | DISPLAYS THE HEIGHT OF THE CONTROL IN PIXELS. |
| TITLE | DISPLAYS THE TITLE OF THE CONTROL. |
| OPTION GROUP | CANNOT BE EDITED. |
| TEXT | THE DEFAULT STATIC CONTROL TEXT. |
| FONT | DISPLAYS FONT NAME, SIZE AND STYLE. |
| MULTILINE | EDIT CONTROL FEATURE (SINGLE LINE, MULTI LINE); 0=NO, 1=YES |
| RTF | DEFINES THE EDIT CONTROL AS RTF; 0=NO, 1=YES |
| RTFTOOLBAR | WHEN RTF HAS BEEN CHOSEN; A RTF TOOLBAR CAN BE ADDED; 0=NO, 1=YES |
| EXTENDED | WHEN LISTBOXES ARE USED; THEY CAN BE OWNER TYPE (CAN INCLUDE PICTURE, CHECKBOXES ETC); 0=NO, 1=YES |

Fig. 13

METHOD AND APPARATUS FOR SUPPORTING MULTIPLE ALTERNATIVE GRAPHICAL USER INTERFACES IN COMPUTER-MODERATED ELECTRONIC COMMERCE

RELATED APPLICATIONS

This application claims priority under 35 U.S.C. § 119 to U.S. Provisional Application No. 60/130,735 filed Apr. 20, 1999.

BACKGROUND OF THE INVENTION

1. Field of the Invention

The present invention relates in general to computer-moderated methods of conducting commercial transactions, and in particular to graphical user interfaces utilized for electronic commerce.

2. Description of the Prior Art

There has been a sudden increase in the utilization of electronic commerce for the sale of goods and services. This is especially true with the explosion of activity related to Internet commerce, but is also true for commerce conducted utilizing distributed data processing systems which require a dial-in or other similar connection. A great amount of detailed information can be provided to potential buyers over the Internet or a distributed data processing system. This gives the buyer a greater number of choices. And it also gives the seller a greater number of opportunities and options for merchandising its goods or services.

Modern electronic commerce depends on a number of interchanges between potential buyers and sellers through a series of dialog boxes in cascading graphical user interfaces. Such graphical user interfaces include a variety of relatively conventional graphical components which are utilized to communicate the options which are available to the buyer, and to receive the buyer's selection. Typically, the options available to the potential customer are set forth in a manner which allows buttons to be depressed through manipulation of the graphical pointing device. In other words, most of the transaction "dialog" is conducted through the presentation of a series of options to the potential customer and a recordation of the customer's selection of the particular options through the use of a graphical pointing device.

A variety of relatively well-known companies have relied heavily upon Internet-moderated commercial transactions. One leader in this area is Dell Computer Corporation of Round Rock, Tex. Dell has positioned itself well within the computer hardware market by relying extensively upon the Internet to conduct a relatively extensive dialog with potential customers, all moderated through a series of graphical user interface screens, which present the customer with a variety of options and choices. Through such reliance on the Internet, Dell has been able to keep its overhead low, turn its inventory often, and obtain good results for its shareholders in terms of marketshare growth, increased dividends, and rapid increases in stock value. Dell is just one example of the increasing and highly effective use of the Internet to conduct commerce.

For those engaged in electronic commerce, any means which can be utilized to further reduce costs and to stabilize operations will likely be appreciated and adopted.

SUMMARY OF THE INVENTION

It is one objective of the present invention to provide an improved method and apparatus for supporting multiple alternative graphical user interfaces in computer-moderated electronic commerce.

It is another objective of the present invention to provide an improved method and apparatus for supporting a low bandwidth graphical user interface for use in computer-moderated electronic commerce.

It is a particular objective of the present invention to provide an improved method and apparatus for supporting a low bandwidth HTML graphical user interface for use in computer-moderated electronic commerce.

These and other objectives are achieved as is now described.

BRIEF DESCRIPTION OF THE DRAWINGS

The novel features of the present invention are set forth in the appended claims. The invention itself, however, as well as a preferred mode of use, further objectives and advantages thereof, will best be understood by reference to the following detailed description of the preferred embodiment when read in conjunction with the accompanying drawings, wherein:

FIG. 13 is a table of values used in conjunction with the preferred embodiment;

DETAILED DESCRIPTION OF THE INVENTION

Figure 1:
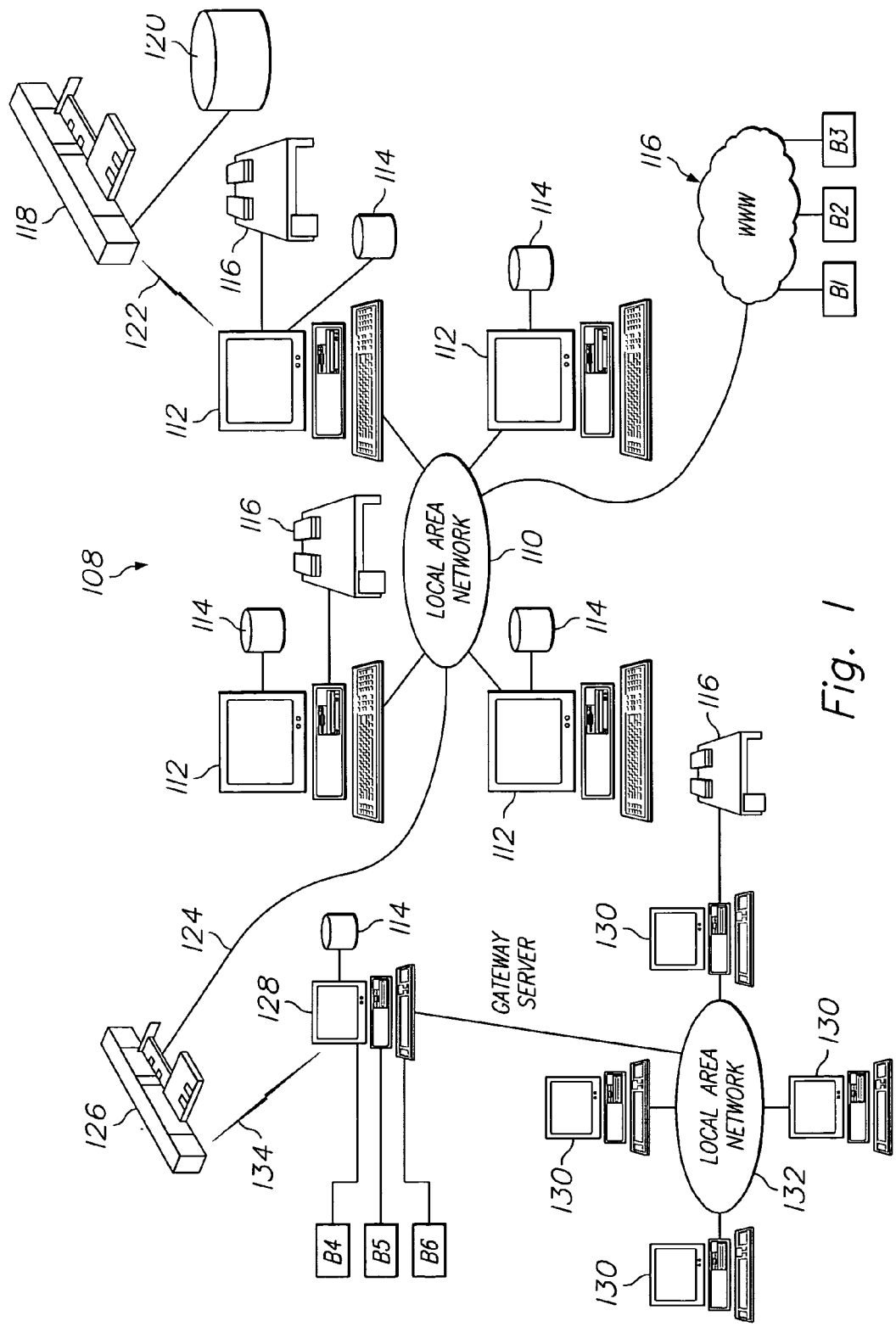
FIG. 1 is a simplified and pictorial representation of a distributed data processing system.

With reference now to the figures and in particular with reference to FIG. 1, there is depicted a pictorial representation of the Internet 106 and a distributed data processing system 108 either or both of which may be utilized to implement the method and system of the present invention. As may be seen, distributed data processing system 108 may include a plurality of networks, such as Local Area Networks (LAN) 110 and 132, each of which preferably includes a plurality of individual computers 112 and 130, respectively. Of course, those skilled in the art will appreciate that a plurality of Intelligent Work Stations (IWS) coupled to a host processor may be utilized for each such network.

As is common is such data processing systems, each individual computer may be coupled to a storage device 114 and/or a printer/output device 116. One or more such storage devices 114 may be utilized, to store the various data objects or documents which may be periodically accessed and processed by a user within distributed data processing system 108.

Still referring to FIG. 1, it may be seen that distributed data processing system 108 may also include multiple mainframe computers, such as mainframe computer 118, which may be preferably coupled to Local Area Network (LAN) 110 by means of communications link 122. Mainframe computer 118 may also be coupled to a storage device 120 which may serve as remote storage for Local Area Network (LAN) 110. A second Local Area Network (LAN) 132 may be coupled to Local Area Network (LAN) 110 via communications controller 126 and communications link 134 to a gateway server 128. Gateway server 128 is preferably an individual computer or Intelligent Work Station (IWS) which serves to link Local Area Network (LAN) 132 to Local Area Network (LAN) 110.

As discussed above with respect to Local Area Network (LAN) 132 and Local Area Network (LAN) 110, a plurality of data processing procedures or documents may be stored within storage device 120 and controlled by mainframe computer 118, as Resource Manager or Library Service for the data processing procedures and documents thus stored.

Of course, those skilled in the art will appreciate that mainframe computer 118 may be located a great geographical distance from Local Area Network (LAN) 110 and similarly Local Area Network (LAN) 110 may be located a substantial distance from Local Area Network (LAN) 132. That is, for example, Local Area Network (LAN) 132 may be located in California while Local Area Network (LAN) 110 may be located within Texas and mainframe computer 118 may be located in New York.

FIG. 1 also shows a graphical representation of a connection between local area network 110 and the Internet 106 (World Wide Web) which is a wide area network connecting thousands of disparate networks in industry, education, government, and research, which utilizes TCP/IP as the standard for transmitting information. As is shown in the view of FIG. 1, a plurality of buyers (B1, B2, B3) may connect through the Internet 106 to local area network 110 which, for purposes of explanation, represents a local area network under the control of a seller conducting electronic commerce. Alternatively, and simultaneously, a plurality of buyers (B4, B5, B6) may make a dial-in connection through gateway server 128 to local area network 110 in order to conduct electronic commerce with the seller which maintains control over local area network 110. The seller may utilize either or both the Internet connection or dial-in connection in order to communicate simultaneously with a number of buyers, including B1, B2, B3, B4, B5, and/or B6.

Figure 2:
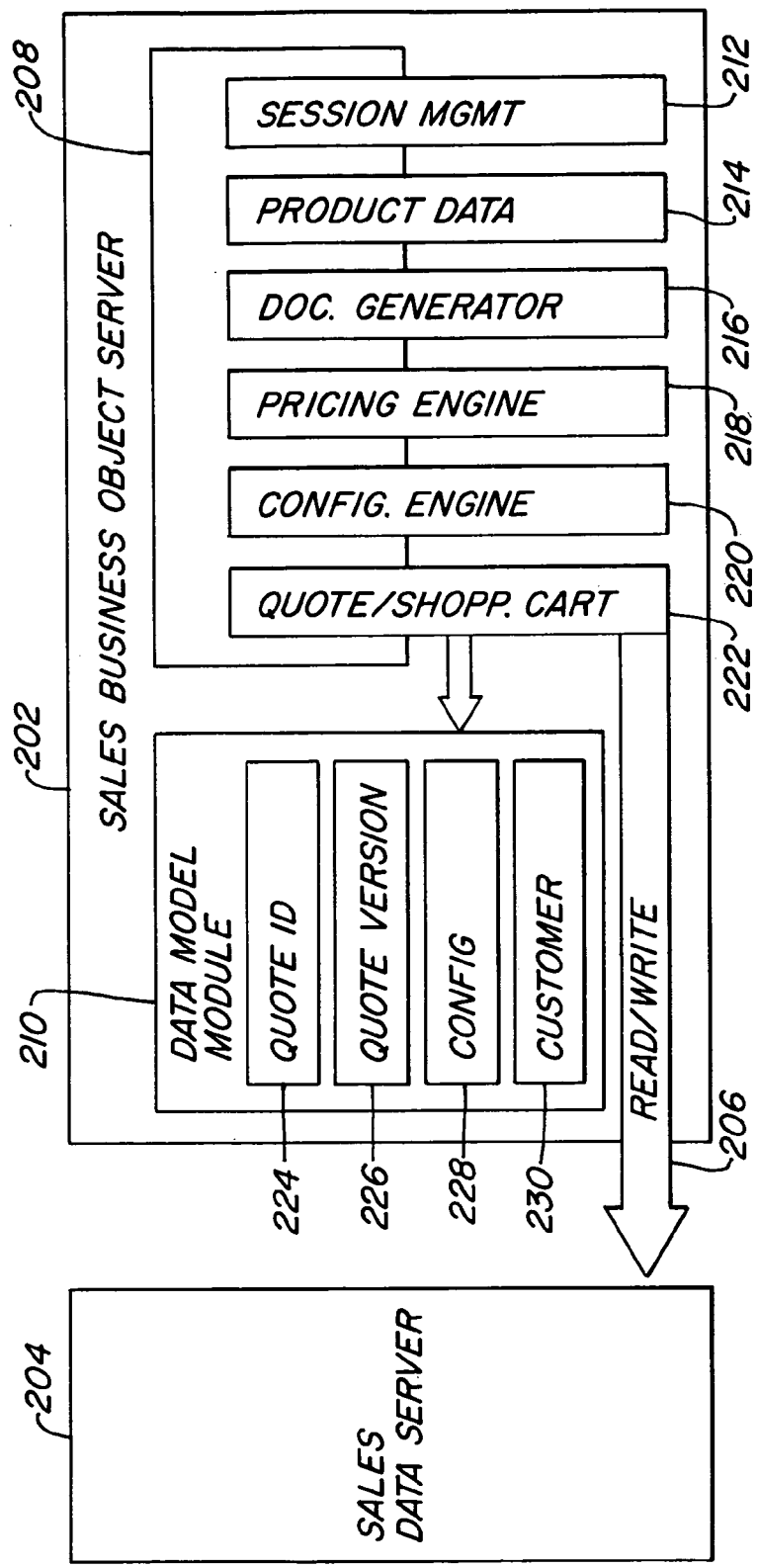
FIG. 2 is a simplified block diagram representation of an inside sales business object server.

FIG. 2 is a simplified block diagram representation of an inside sales business object server 202 which is connected via read/write bus 206 to sales data server 204. Sales business object server 202 is composed of a number of software packages which are dedicated to particular electronic commerce functions. A read/write bus 206 allows sales business object server 202 to read data from sales data server 204, and also allows sales business object server 202 to write data to the sales data server 204. The sales business object server 202 includes a suite of server services modules 208 and a suite of data model modules 210. Preferably, the server services modules 208 include a session management module 212, a product data module 214, a document generator module 216, a pricing engine module 218, a configuration engine module 220, and a quote/shopping cart module 222. The session management module 212 is utilized to control the electronic dialog between each buyer or potential buyer and the seller and typically includes product names, product serial numbers, product descriptions, and product fact sheets as well as other similar information. The product data module 214 includes product information about the product array offered by the seller. The document generator module 216 is utilized to generate printed materials which support the electronic transaction, such as shipping and invoice documentation. The pricing engine module 218 is utilized to allow the seller to intelligently and accurately generate the total or "end" price to the customer. Preferably, the pricing engine module will take into account differences in currency, various discounts offered by the seller, the cost of freight and shipping, and the cost of warranties and extended service options. The configuration engine module 220 is utilized in order to at least partially automate a process through which the customer's needs are analyzed. Additionally, the configuration engine module is utilized to determine component compatibility in order to prevent the attempted combination of parts, components, or assemblies which are incompatible or not optimal. The quote/shopping cart module 222 is utilized to generate quotation documentation (both electronic and paper documents), if necessary, and which builds automatically a quotation based upon configuration information, price information, and quote information.

The data model modules 210 includes a plurality of software modules including a quote identification module 224, a quote version module 226, a configuration module 228, and a customer module 230. The quote identification module 224 is utilized to keep track of the identification of various quotes made to potential and actual customers. The quote version module 226 allows the system to keep track of a series of quotations to potential customers and actual customers in order to prevent inconsistencies between quotes, or other losses of information. The configuration module 228 maintains any information relating to particular potential or proposed configurations. The customer module 230 maintains customer information such as identity, address, telephone, payment method, and similar information.

Collectively, the server services modules 208 and data model modules 210 cooperate to allow orderly and efficient communication between the seller and potential buyers through sales data server 204.

Figure 3:
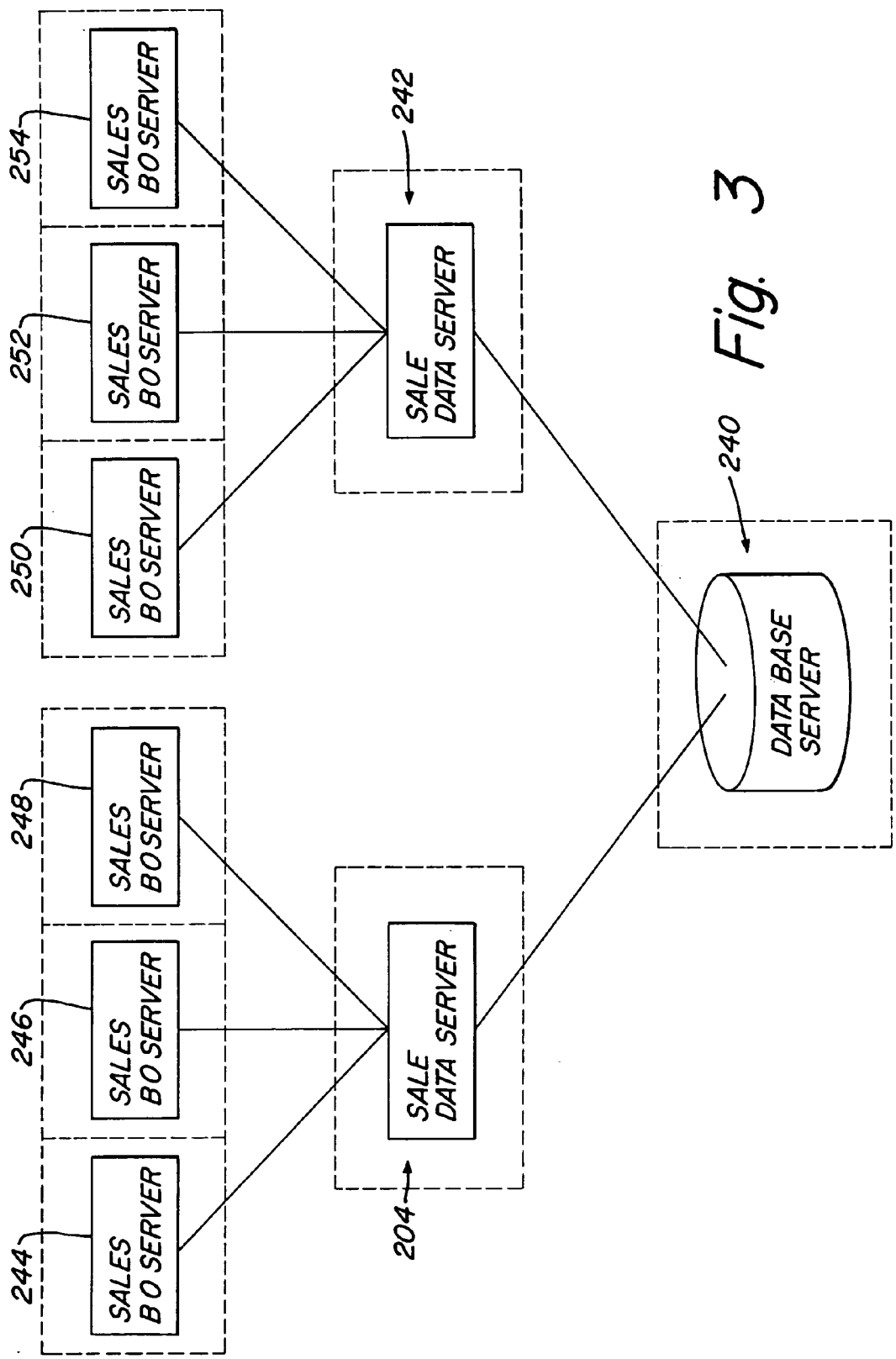
FIG. 3 is a block diagram and pictorial representation of the scalability of the present invention which represents one commercially advantageous product feature.
Figure 4:
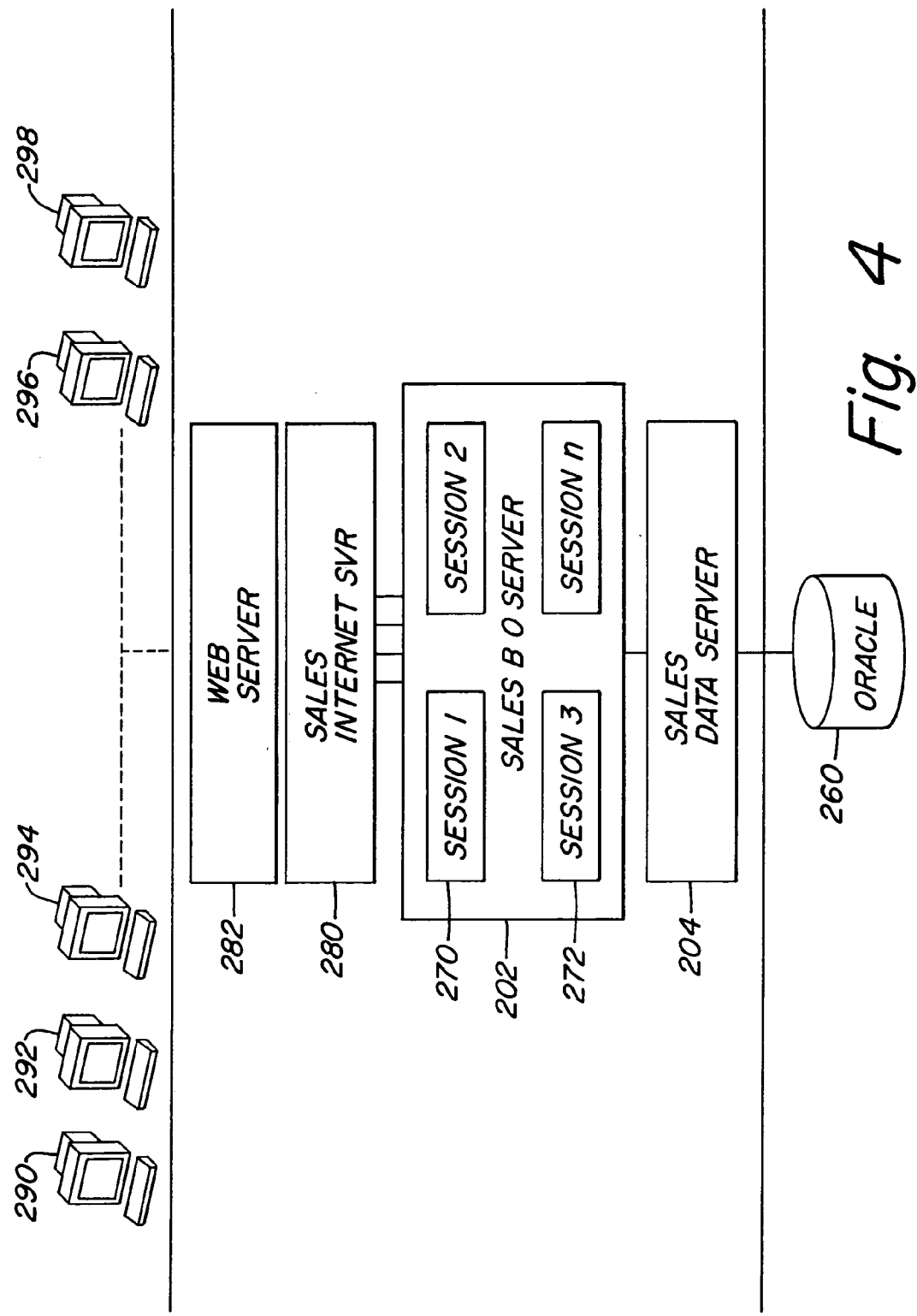
FIG. 4 is a block diagram and pictorial representation of the multithread capability of the computer moderated electronic commerce system of the present invention which represents another commercially advantageous feature.

Some advantages that may be obtained utilizing the present invention are graphically depicted in FIGS. 3 and 4. FIG. 3 is a block diagram and pictorial representation of the scalability of the present invention which represents one commercially advantageous product feature, while FIG. 4 is a block diagram and pictorial representation of the multi-thread capability of the computer moderated electronic commerce system of the present invention which represents another commercially advantageous feature. As depicted in FIG. 3, a database server 240 may support a plurality of sales data servers, including sales data servers 204, 242. Each of the sales data servers 204, 242 may in turn support a number of sales business object servers. For example, sales data server 204 may support sales business object servers 244, 246, 248; additionally, sales data server 242 may support sales business object servers 250, 252, 254. In this manner, the computer moderated electronic commerce system of the present invention can be scaled in a pyramidal fashion which allows for a theoretically unlimited number of concurrent users being supported.

The computer moderated electronic commerce system of the present invention also allows simultaneous multithread operation, as is depicted in block diagram in pictorial form in FIG. 4. As is shown, a data server 260 may be utilized to allow database connection pooling. This optimizes the efficiency of database resource utilization. In the preferred embodiment, an ORACLE database may be utilized. The data server 260 provides the data to the application server layer which is composed of a number of separate components, some of which were discussed above in connection with FIG. 2. As is shown, sales data server 204 is communicatively and operationally coupled with sales business object server 202 which is capable of supporting a number of simultaneous electronic commerce communication sessions including sessions 270, 272, 274, 276. The sales business object server 202 is communicatively and operationally coupled to sales Internet server 280 which is in turn communicatively and operationally coupled to web server 282. Web server 282 allows for the simultaneous communication with potential buyers at and utilizing computing devices 290, 292, 294, 296, and 298. Essentially, sales business object server 202 is a multithread server which utilizes multiprocessor servers. Multiple user sessions may be enabled in one process, which makes for efficient use of the operating system resources. The utilization of web server 282 and Internet sales server 280 facilitates relatively low-cost simultaneous communication with buyers and potential buyers. The communication between web server 282 and the computers (290, 292, 294, 296, and 298) which are under control of the buyers and potential buyers is conducted utilizing a relatively low bandwidth HTML dialog.

In the prior art, companies that conducted electronic commerce did so utilizing a Windows-based graphical user interface which was accessed through conventional dial-in operations. The Windows-based graphical user interface typically communicated with a tabular database (such as a Sequel database). The bandwidth for communication between the Windows-based graphical user interface and the tabular database was relatively large in comparison with the bandwidth available for HTML-moderated communications via the Internet. As a practical manner, many entities that currently conduct electronic commerce have significant investment in non-Internet facilities including dial-up capabilities and Windows-based graphical user interfaces, as well as substantial investments in databases relating to the products, pricing, and customers. As electronic commerce migrates from dial-up sessions (where bandwidth presented no real problems) toward Internet-based communications (where bandwidth becomes a substantial problem) a significant number of problems must be resolved. Preferably, and in accordance with the present invention, an entity's investment in its electronic commerce systems need not be wasted. In accordance with the present invention, a variety of graphical user interfaces may be constructed and maintained, without requiring reinvestment in, or recreation of, the databases which supported such electronic commerce.

Figure 5:
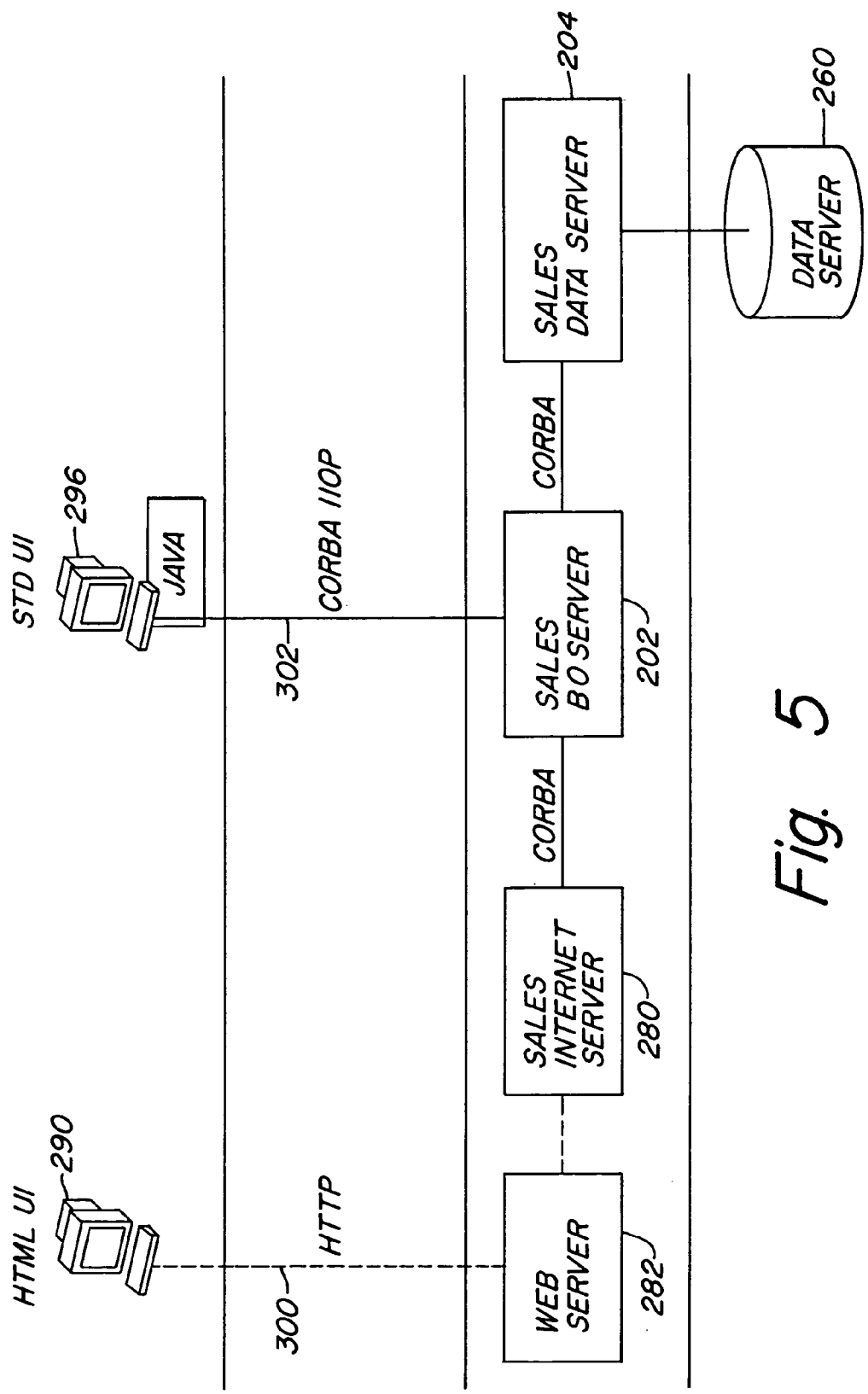
FIG. 5 is a block diagram and pictorial representation of an overview of the user interface options available utilizing the present invention which represents still another commercially advantageous product feature.

FIG. 5 is a block diagram and pictorial representation of an overview of the interface options available utilizing the present invention which represents still another commercially advantageous product feature. The view of FIG. 5 represents the different layers of processing which must be implemented in order to provide the system of the present invention. As shown, the data server 260 maintains the metadata which is utilized during the commercial transaction. This may include component identification and component property of the various items offered for sale by the seller. The data server 260 communicates with the sales data server 204. The sales data server 204 communications with the sales business object server 202. The sales business object server 202 may communicate over communication link 302 with data processing system 296. The communication between the sales business object server 202 and data processing system 296 may be conducted utilizing the JAVA programming language; therefore, the client-user interface is supported by JAVA and communication is conducted 9 over a local area network or a high speed wide area network.

An alternative means of communicating with buyers is also provided. As is shown in FIG. 5, sales internet server 280 may also communicate with sales business object server 202. Web server 282 in turn communicates with sales internet server 280. Web server 282 communications intermittently over communication link 300 utilizing an HTTP protocol. Communication is conducted with one or more data processing systems such as data processing system 290. Data processing system 290 is operating in a Web browser mode of operation. Communication between data processing system 290 and Web server 282 is conducted utilizing HTML. The communication link 300 is a low-speed wide-area network or internet connection. The view of FIG. 5 shows two different user interfaces which are supported by the data maintained in data server 260. The dialog which makes up the content of the electronic transaction is constructed dynamically by the sales data server 204 and sales business object server 202 utilizing the metadata maintained on data server 260. In this way, a single data base may be utilized to support a plurality of simultaneous transaction dialogs in a plurality of differing programming interfaces supported by different programming languages and over communication links with different capabilities.

Figure 6:
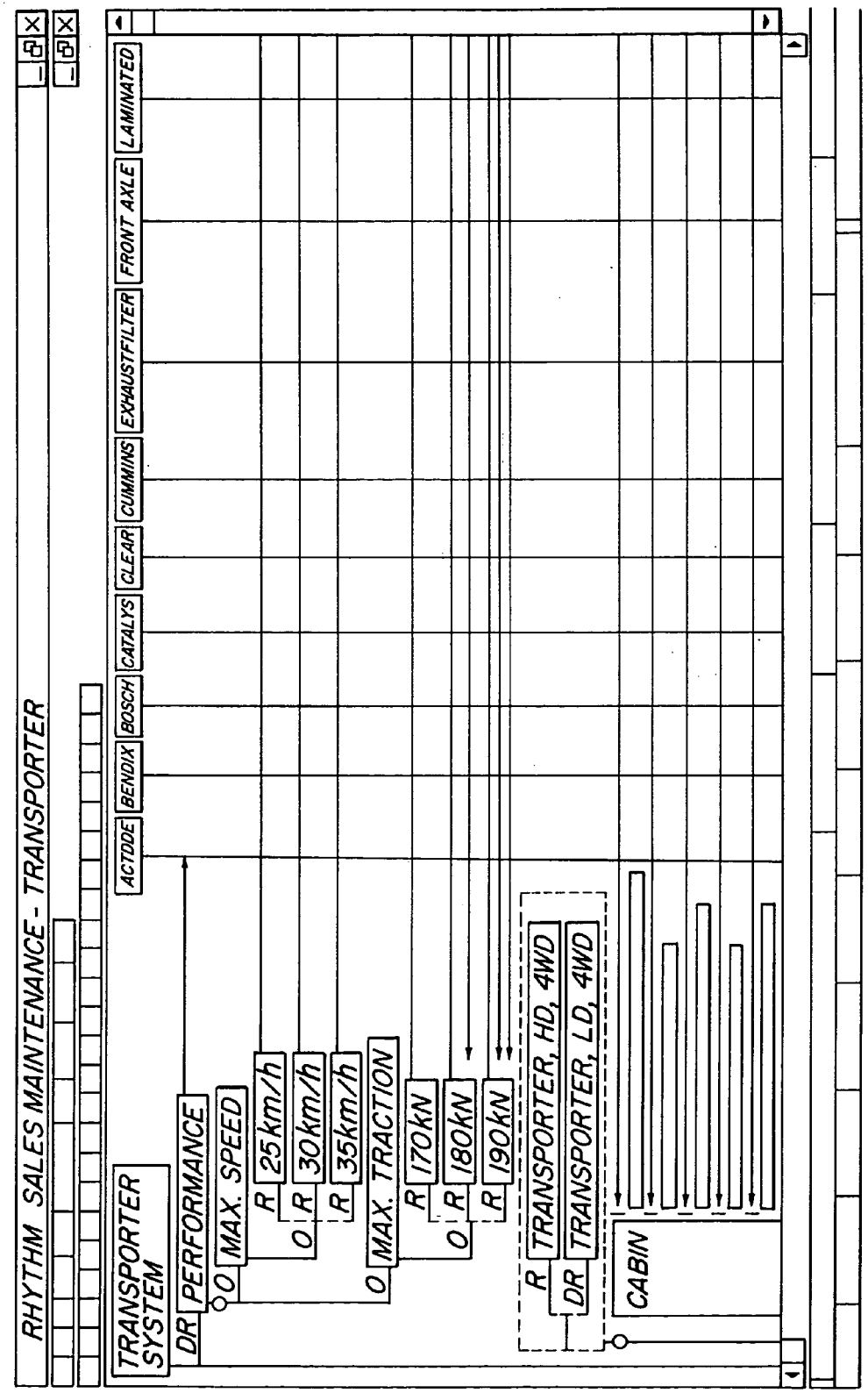
FIG. 6 is a pictorial representation of an exemplary rule maintenance module.
Figure 7:
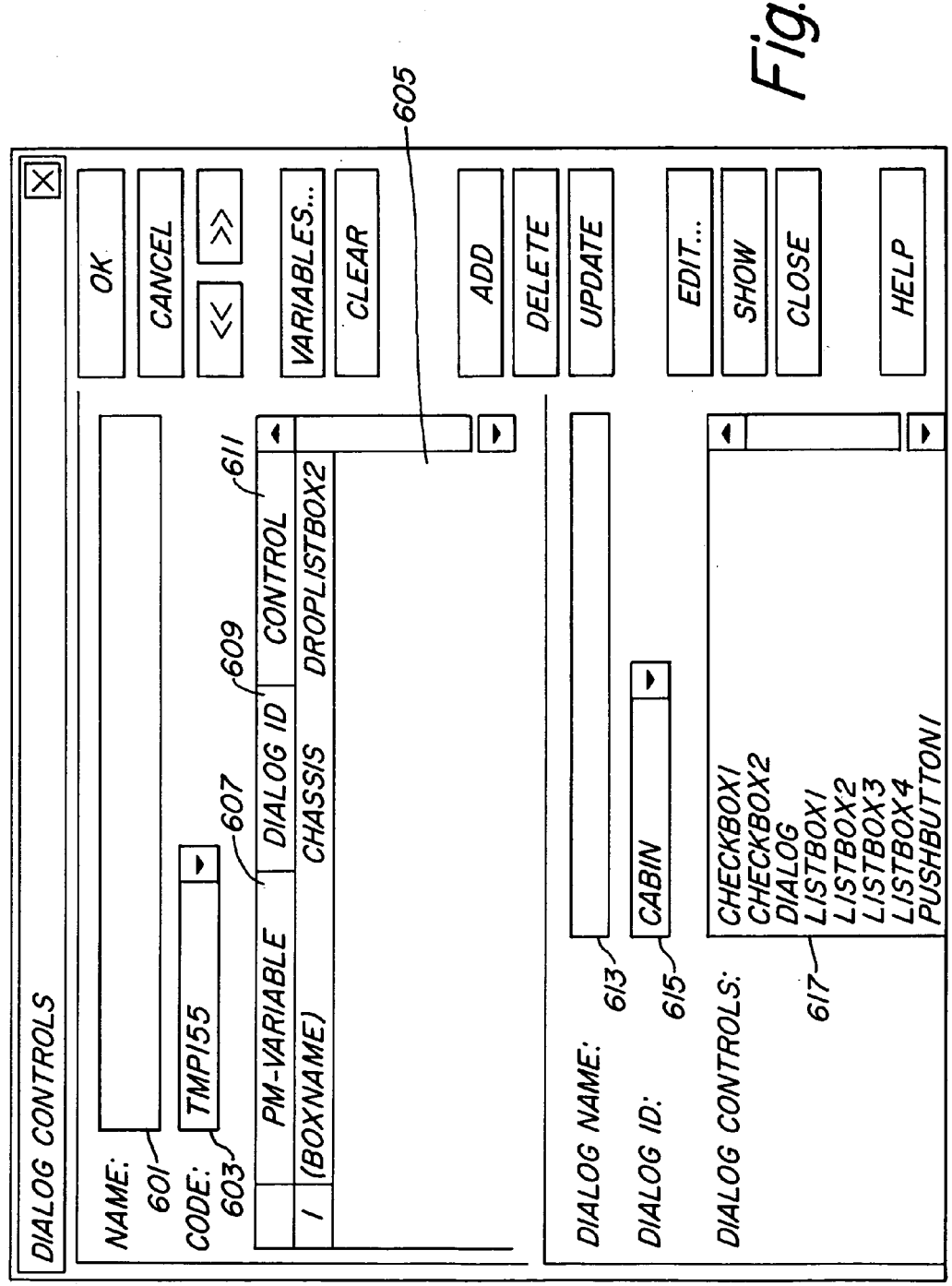
FIG. 7 is a pictorial representation of an exemplary dialog control screen in accordance with the present invention.
Figure 8:
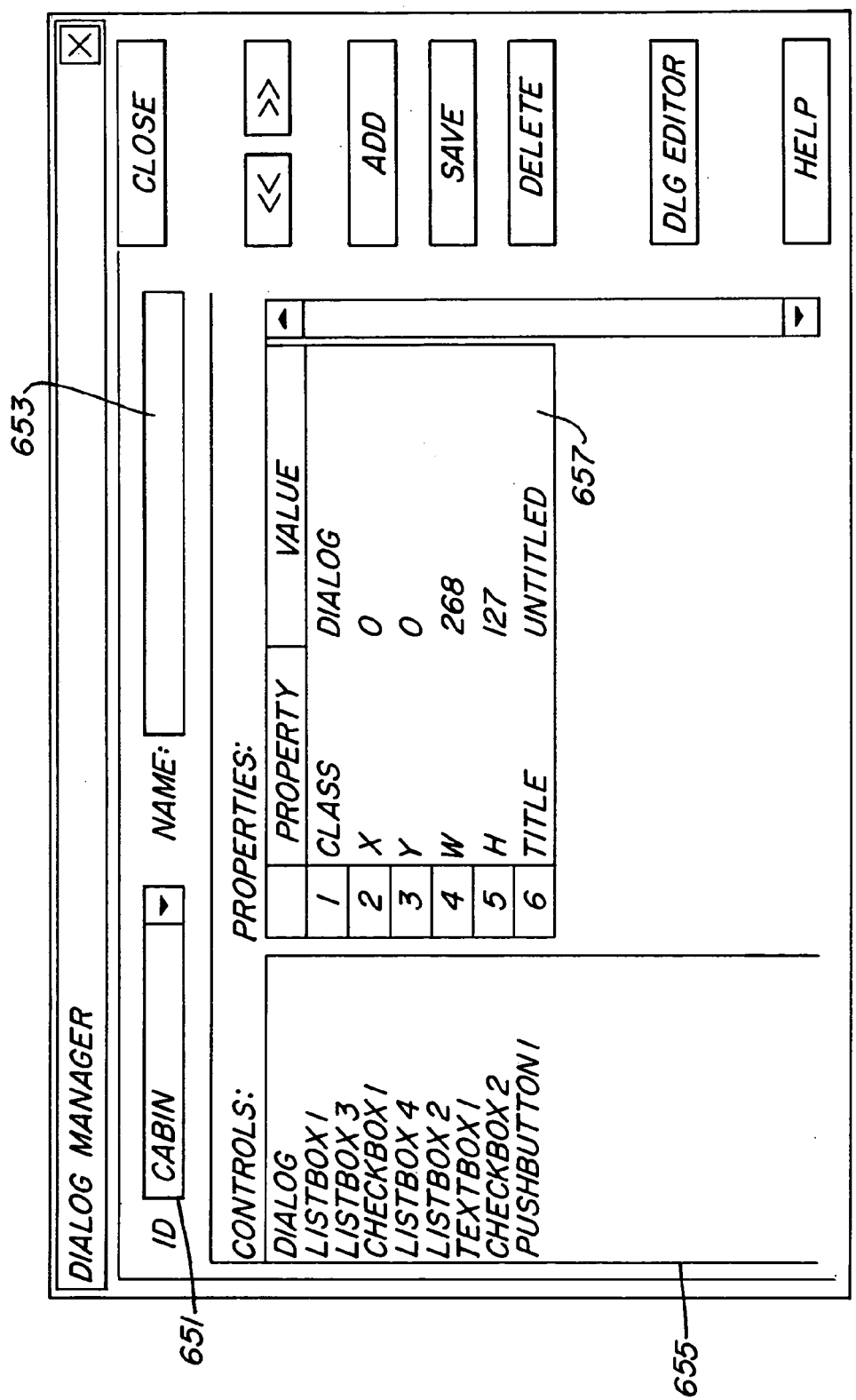
FIG. 8 is a pictorial representation of an exemplary dialog manager screen in accordance with the present invention.
Figure 9:
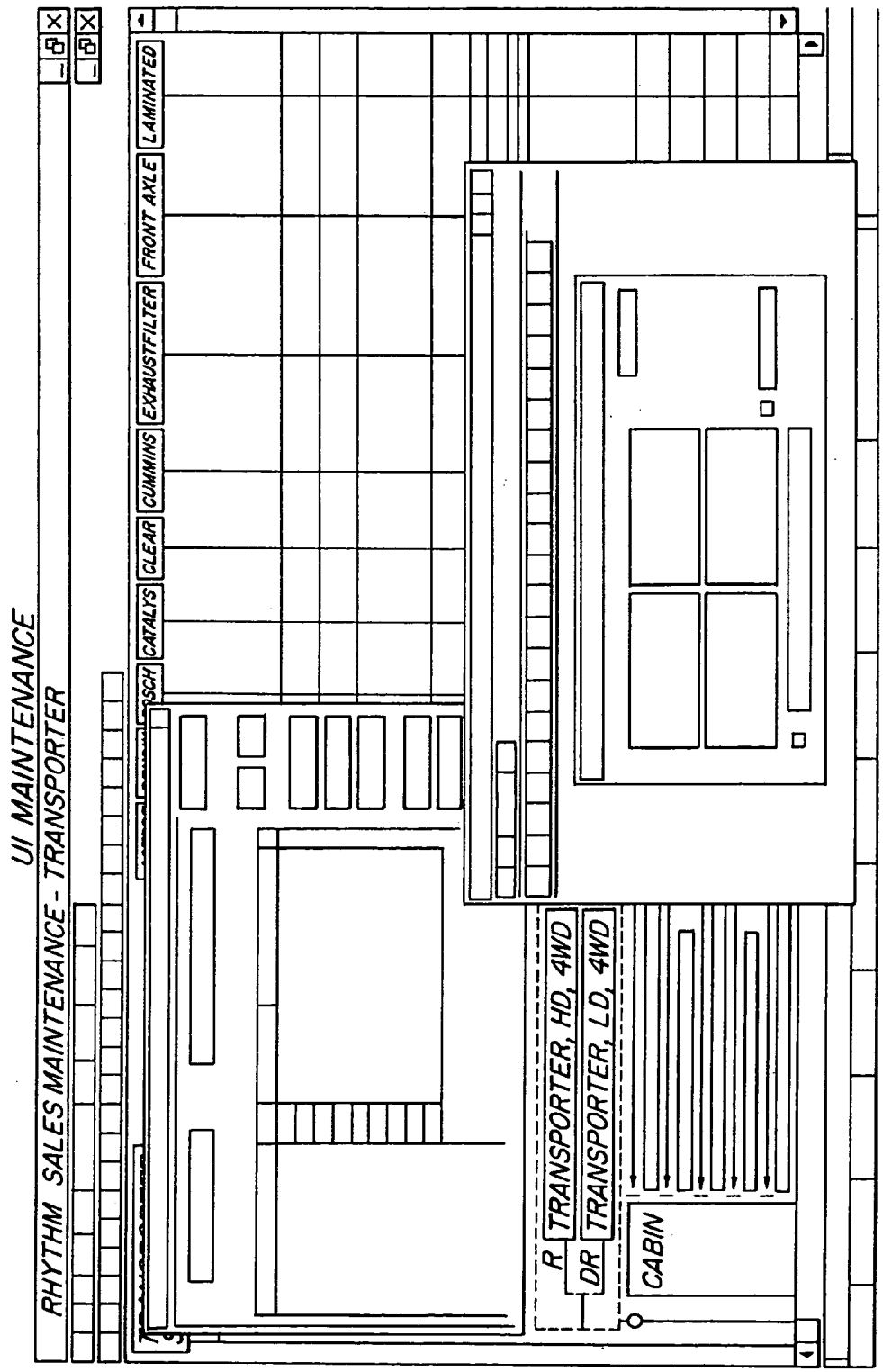
FIG. 9 is a pictorial representation of an exemplary user interface maintenance operation in accordance with the present invention.

FIG. 6 is a pictorial representation of an exemplary rule maintenance module. The content of the dialog may be maintained utilizing such a rule maintenance system which allows for the visual mapping of information. In this manner, the various components, sub-assemblies, and buyer options may be mapped out in a logical manner. The dialog between the seller and potential buyers may be constructed utilizing a "Dialog Control" module, which is depicted in FIG. 7, and maybe manually generated utilizing a "Dialog Manager" module which is depicted in FIG. 8. As is shown, the Dialog Control module in FIG. 7 is utilized to enumerate the various dialog controls which are associated with a particular graphical interface screen. The example depicted in FIG. 7 relates to a dialog I.D. relating to the "chassis" of a vehicle. The seller may utilize the various command buttons on the right side of the screen to, add, delete, edit, clear the various controls which can be, or are, in fact, associated with a particular graphic user interface. The Dialog Manager in FIG. 8 depicts the dialog associated with a "cabin" graphical user interface. As is shown, the dialog includes ListBox1, ListBox3, CheckBox1, ListBox4, ListBox2, TextBox1, CheckBox2, and PushButton1. Each one of these graphical user interface items has various "property" and "value" attributes associated therewith. FIG. 9 depicts a number of simultaneously open and overlapping screens, including a Sales Maintenance screen which maps the relationship between the components, a Dialog Manager screen which lists the various dialog items associated with the "cabin" graphical user interface, and a Dialog Editor screen which is utilized to edit the Dialog Manager screen. Utilizing these functions, all of which are known in the prior art, one may construct graphical user interface screens which are logically linked to one another, which include a variety of dialog items, and which may be edited when product content changes.

Figure 10:
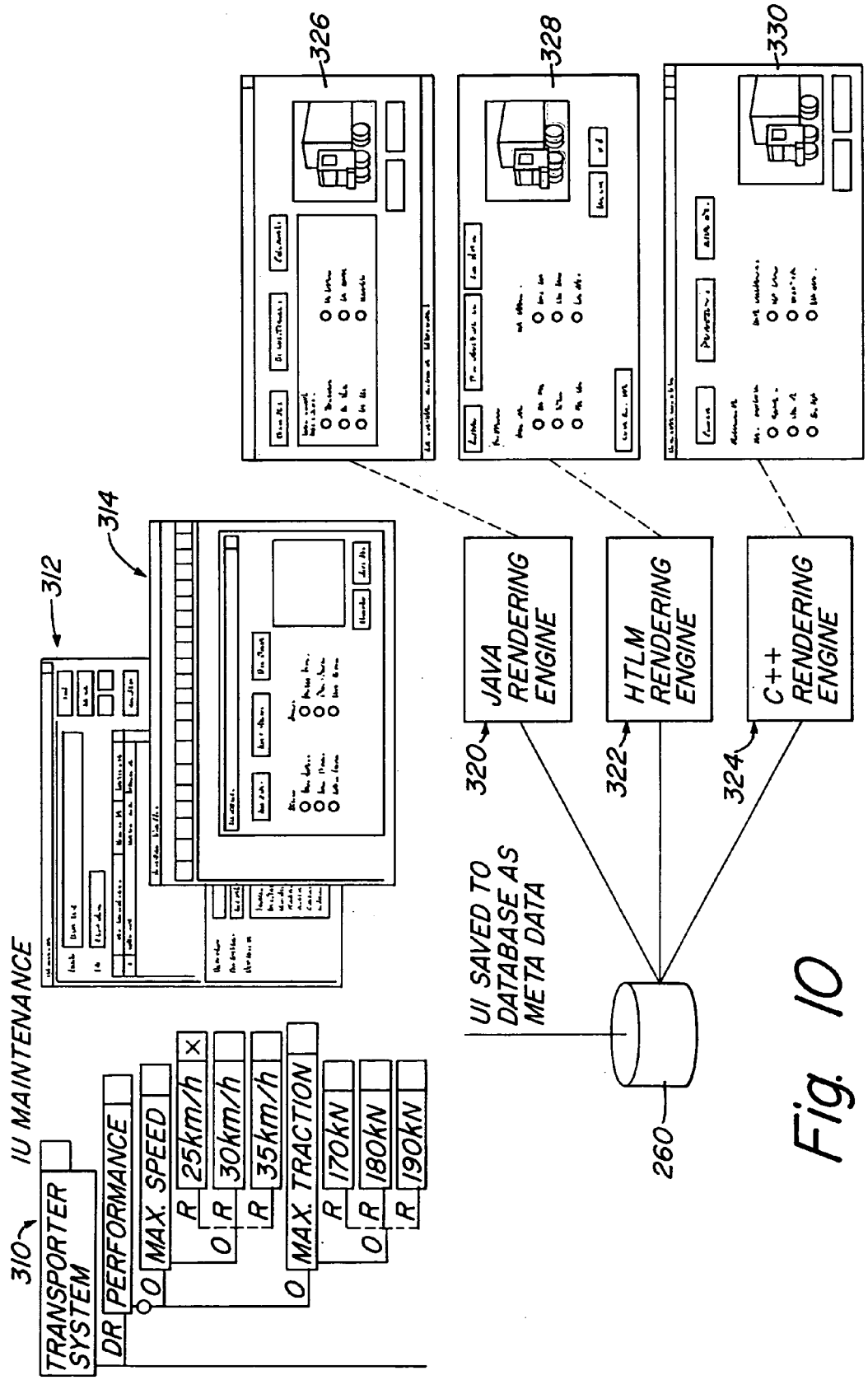
FIG. 10 is an exemplary pictorial and block diagram representation of a plurality of user interfaces which may be supported utilizing the present invention.

FIG. 10 is a pictorial and graphic representation of the maintenance of the various user interfaces in accordance with the preferred embodiment of the present invention. As is shown, a product rule set 310 is utilized to map or organize the various product features and options which are offered by the seller to potential buyers. The Dialog Controls module 312 is utilized to control the content of the dialog boxes of a graphical user interface. The content may be edited utilizing Dialog Editor 314. In accordance with the preferred embodiment of the present invention database 260 maintains the metadata associated with the product line and options which are set forth in the product rule set 310. Database 260 supports a variety of rendering engines which are utilized to generate graphical user interface screens as part of the dialog transaction. As is shown, JAVA-rendering engine 320 accesses database 260 in order to generate dynamically and in real time user interface 326 which is a JAVA applet. HTML-rendering engine 322 utilizes database 260 to generate dynamically and in real time graphical user interface screen 328 which is an HTML user interface. C++-rendering engine 324 utilizes data from database 260 to generate dynamically and in real time graphical user interface 330. Note that graphical user interfaces 326, 328, and 330 are all very similar in their content and layout, even though they are generated in different operating environments utilizing different programming languages. All of the rendering engines 320, 322, and 324 make dynamic use of the Dialog Control box 312 in order to generate the graphical user interfaces 326, 328 and 330.

A method and apparatus is provided which allows for a single database to support dynamically a number of multiple alternative graphical user interfaces, all in order to allow computer moderated electronic commerce. The database interacts with a number of rendering engines which utilize metadata maintained in the database to dynamically generate an electronic commerce transaction dialog in a plurality of different communication, operation, and programming environments. For example, the present invention may be utilized to simultaneously support graphical user interfaces constructed utilizing the programming language C++. Alternatively, and additionally, the system may support a graphical user interface constructed utilizing the JAVA programming language. Alternatively, and additionally, the invention allows a single database to support a relatively low band with communication in an internet environment utilizing the HTML programming language. In accordance with the present invention, the differing graphical user interfaces may have the same general appearance and the same series of dialog boxes in order to enable the electronic commerce.

Figure 11:
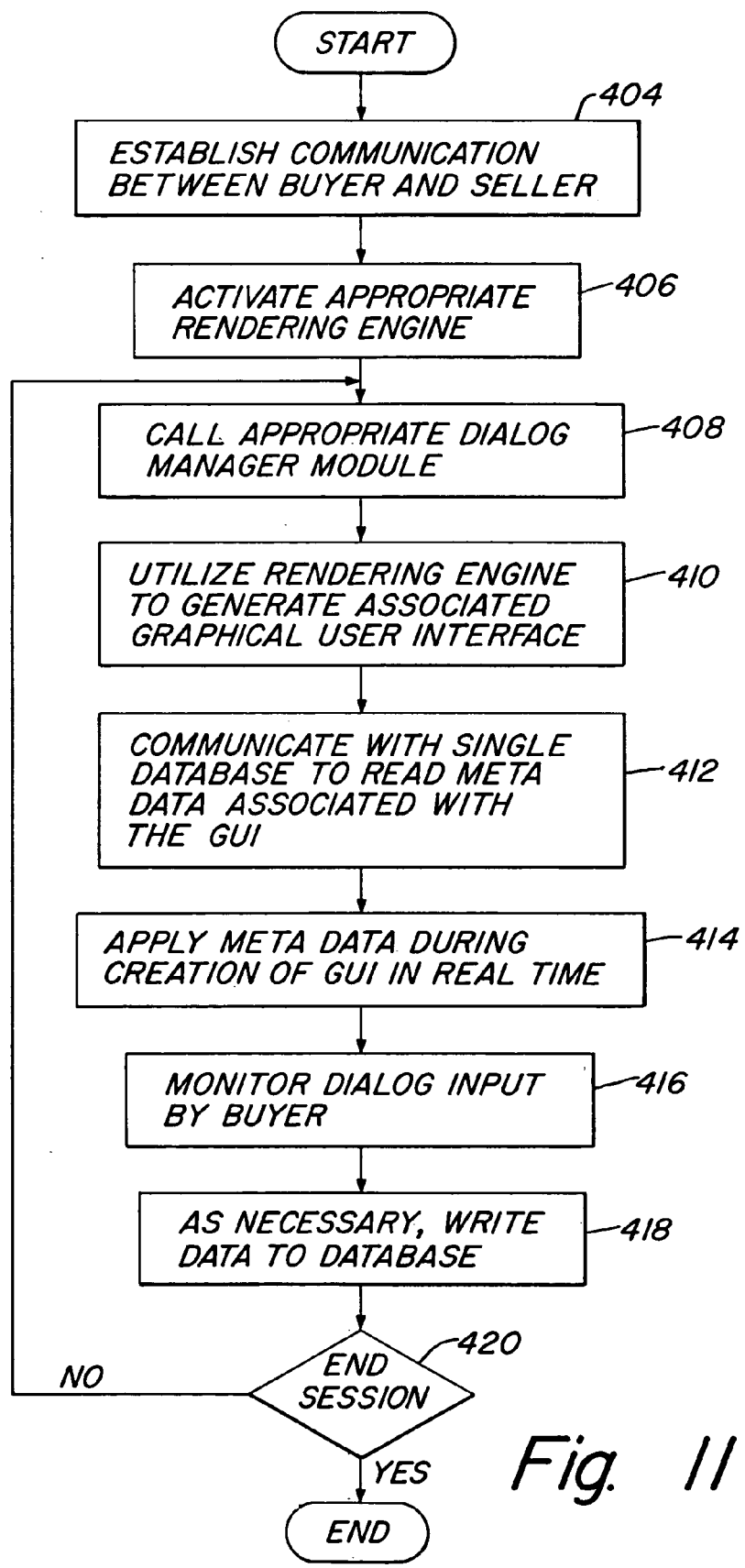
FIG. 11 is a flowchart representation of the utilization of a rendering engine to dynamically construct a series of graphical user interfaces, in real time, and utilizing a single database.

FIG. 11 is a flowchart representation of dynamically construct a series of graphical user interfaces, in real time, and utilizing a single database. The process starts at block 404, wherein communication is established between a buyer and a seller. This communication will occur over a particular communication channel. For example, the buyer may make contact with the seller utilizing the Internet by accessing the seller's website. Alternatively, the buyer may dial-in to a wide area network utilizing conventional telecommunications modem connections in order to communicate with the seller utilizing a graphical user interface constructed in the conventional manner utilizing the C++ programming language. Alternatively, the potential buyer may make communication with the seller utilizing JAVA applets. All three of these scenarios are alternatives to one another and are graphically depicted in FIG. 10. In accordance with step 406, the seller's data processing system activates the appropriate rendering engine which is suited for the mode and channel of communication which has been established by the buyer. For example, the buyer is making contact utilizing the Internet, the HTML rendering engine will be activated. Then, in accordance with step 408, the seller's data processing system calls the appropriate dialog manager module. In actual practice, an electronic transaction is composed of a series of cascading and logically-linked graphical user interfaces. Each graphical user interface has associated with it a particular dialog manager module, as is conventional. The dialog manager module identifies each and every component of the graphical user interface which will be presented to the buyer. Some of the components are "inactive" components and merely present images, data, or information; however, other elements of the graphical user interface are "active" elements which are adapted to receive user input typically through the detection of the operator actuation of the graphical pointing device (typically the depression of the left button on the mouse associated with the buyer's computer). Then, in accordance with step 410, the seller's data processing system utilizes the rendering engine to generate an associated graphical user interface. Concurrently with this step, and as is set forth in step 412, the data processing system of the seller communicates with a single database in order to read metadata which is associated with the graphical user interface. As described above, the metadata may be arranged utilizing conventional tools such as a rule maintenance module. The metadata may comprise 17 simple product number and feature information; however, in alternative electronic transactions, the metadata may comprise a substantial body of transaction and product information. The more complex the subject matter of the electronic transactions, the more likely there is to be associated with each graphical user interface a greater amount of detailed information. This communication between the rendering engine and the single database is conducted in real time and is done so dynamically during the interaction between the seller's data processing system and the buyer's data processing system. One significant advantage of this approach is that the seller need not maintain multiple parallel databases for each rendering engine; instead, a single database may be maintained. This is a low cost option since there are greater costs associated with maintaining several parallel databases and it is often difficult to maintain consistency between such databases.

In accordance with step 414, the data processing system under the control of the seller applies the metadata dynamically and in real time during creation of the graphical user interface. Then, in accordance with block 416, the seller's data processing system monitors for the dialog in order to determine input or selection of options by the buyer. In accordance with step 418, if necessary, the data processing system under the control of the seller is utilized to write data to the database. Then, in accordance with block 420, the data processing system which is under the control of the seller monitors for a termination of the communication session. If the session is ended, the process ends. However, if the session is not ended, the data processing system under control of the seller monitors the dialog as conducted through the dialog boxes and returns to block 408, wherein the appropriate dialog monitor module is called based upon the buyer's input. The process repeats over and over again until the dialog is terminated. As a consequence of the dialog, a substantial amount of detailed metadata is sequentially presented to the potential buyer in a series of cascading graphical user interface dialog boxes. In turn, the data and selections provided by the buyer may be recorded to the single database in order to enable completion of the transaction or return to the transaction at a later date. It is widely known that many electronic interactions do not result in a transaction at the first contact. It may take several interactions with the buyer before a transaction is completed. This is the reason that most electronic transaction systems have shopping carts which may be preserved in memory and recalled at a later date by the buyer in order to allow the buyer to modify or add to the shopping cart.

Figure 12:
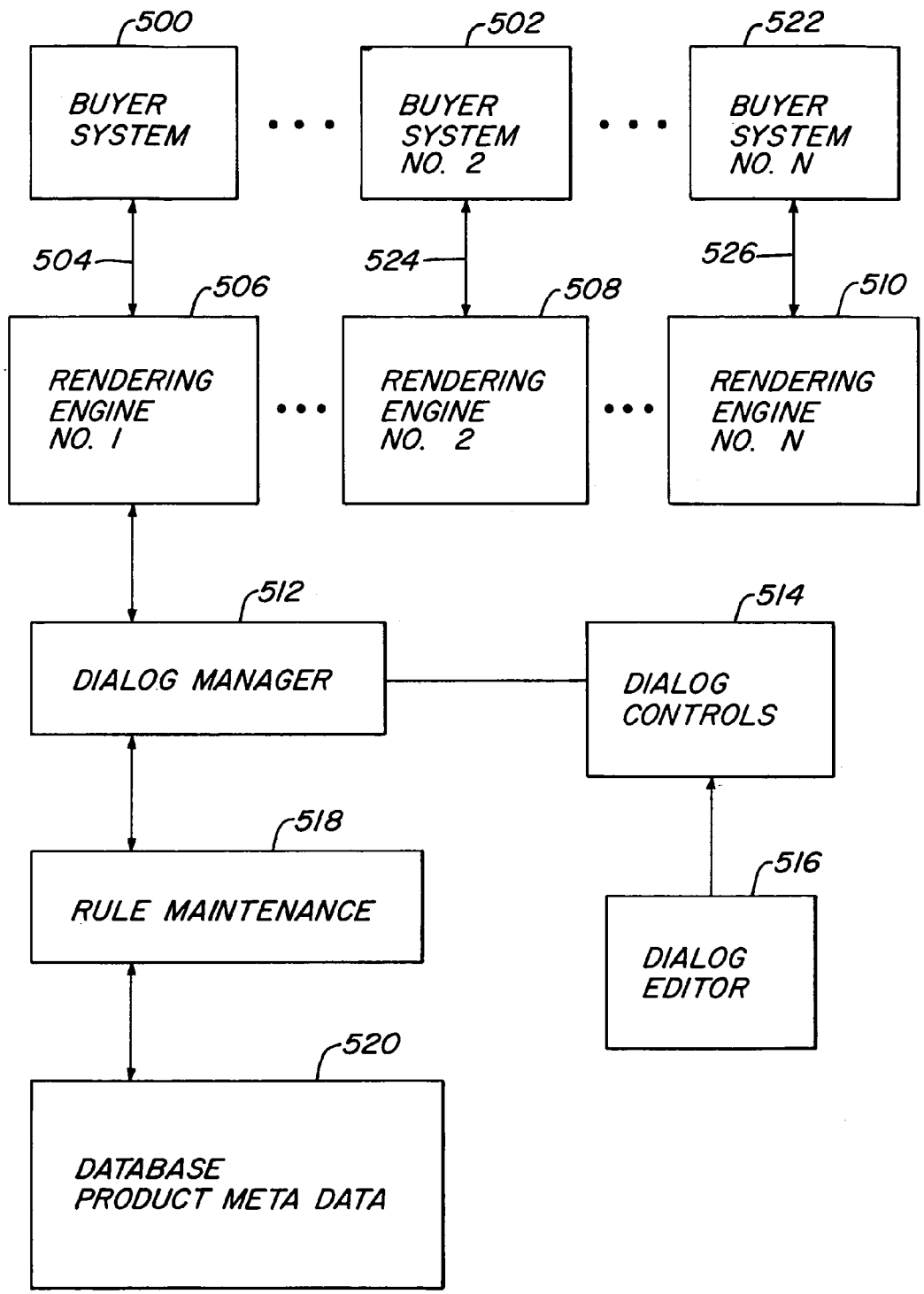
FIG. 12 is a block diagram representation of the utilization of the present invention to support multiple alternative rendering engines from a single database which maintains metadata relating to the objects of the commercial transaction.

FIG. 12 is a block diagram representation of the utilization of the present invention to support multiple alternative rendering engines from a single database which maintains metadata relating to the objects of the commercial transaction. As is shown in FIG. 12, the buyer system 500 communicates with a data processing system under control of the seller through communication channel 504. The communication channel may be a dial-in modem connection or an Internet connection. The mode of accessing the seller's data processing system will determine which particular one of a number of available alternative rendering engines are employed by the seller's data processing system. As is shown in FIG. 12, rendering engines 506, 508, 510 may be utilized to support a variety of alternative communication modes. For example, if the various rendering engines may support communication through JAVA scripts, HTML protocols, or through a graphical user interface constructed utilizing C++. Alternatively, other different programming languages and communication modes may be supported by different rendering engines. Once the appropriate rendering engine is selected, it communicates with a dialog manager module 512. The dialog manager module communicates through rule maintenance module 518 to database 520 which contains product metadata. The dialog manager modules correspond to various graphical user interfaces which are provide to the buyer's system 500 during a series of dialog box communications. The dialog manager module 512 is constructed utilizing a dialog editor 516 through available dialog controls 514. The rendering engine 506 may pass information to database 512 for recordation.

Alternatively and/or concurrently, a number of buyers including buyers 502 and 522 may communicate through communication channels 524, 526 with alternative rendering engines including rendering engines 508, 510. These electronic transactions are communicated through a series of graphical user interfaces which present a series of dialog boxes to the buyer's system 502, 522 and which receive the input of the buyer and selections of the buyer through monitoring the utilization of the graphical pointing device. Rendering engines 508, 510 also access database 520 through dialog manager 512 and rule maintenance module 518. In this manner, a single database 520 is utilized to support a plurality of alternative rendering engines 506, 508, 510, which allow for simultaneous concurrent communication over different communication channels 504, 524, 526 with a plurality of buyer data processing systems 500, 502, 522.

The dialog editor 516 of FIG. 12 is similar to a dialog editor utilized for creating and editing dialogs for the "rhythm" product of i2 Technologies, assignee of the present application. It includes many editing functions which allow a dialog to be either created or edited. Such functions include the following specific functions:

NEW: This command allows the programmer to create a new dialog box.

OPEN: This command allows the programmer to open an existing dialog box template.

SAVE: This command allows a programmer to create a file for the current dialog box template and save that template to the file.

SAVE AS: This command allows the programmer to save the current dialog box template in a file under a new name.

TEST DIALOG: This command allows the programmer to toggle between a run mode in which the dialog box "comes alive" for testing purposes in an edit mode in which one can make changes to the dialog box.

CAPTURE DIALOG: This command allows the programmer to capture standard window controls from a standard window dialog box in another windows application.

EXIT: This command allows a programmer to close the dialog editor module.

EXIT AND RETURN: This command allows a programmer to close a dialog editor and return to the host application.

EDIT MENU: This command allows a programmer to undue up to ten preceding operations.

CUT: This command allows the programmer to select a dialog box control from an application window and place it on a clipboard.

COPY: This command allows the programmer to copy a selected dialog box control without removing it from the dialog editor's application window and places it on a clipboard.

PASTE: This command allows the programmer to insert the contents of the clipboard into a dialog editor.

CLEAR: This command removes a selected dialog box control from the programmer's application window without placing it on the clipboard.

DUPLICATE: This command allows a programmer to create a duplicate copy of a selected control.

SIZE TO TEXT: This command allows a programmer to adjust the board as to certain controls to fit the text displayed on them.

GRID: This command allows a programmer to display a grid dialog box which can be used to display or turn off the grid and adjust the grid spacing.

The Dialog Editor 516 further includes a number of commands which are utilized to add control or communication elements to a particular user interface. Some principal control menu items include the following:

OK BUTTON: This command adds a default "OK" button to a dialog box.

CANCEL BUTTON: This command allows the programmer to add a default cancel button to a dialog box.

HELP BUTTON: This command allows the programmer to add a help button to a dialog box.

PUSH BUTTON: This command allows the programmer to add a push or command button to a dialog box.

OPTION BUTTON: This command allows the programmer to add an option button to a dialog box. An option button is one of two or more link buttons that let user select only one from a group of mutually exclusive choices.

CHECK BOX: This command allows the programmer to add a check box to a dialog box. Users can check or clear a check box to indicate their preference regarding the alternatives specified on the check box label.

GROUP BOX: This adds a group box to a dialog box. A group box is a rectangular design element used to enclose a group of related controls. One can use the optional group box label to display a title for the controls in the box.

TEXT: This command allows a programmer to add a text control to a dialog box. A text control is a field containing text you want to display for the user's information. The text in this field wraps, and the field can contain a maximum of 255 characters. Text controls can either display stand-alone text or be used as labels for text boxes, list boxes, combo boxes, drop list boxes, pictures, and picture buttons. One can choose the font in which the text appears.

TEXT BOX: This control allows the addition of a text box to a dialog box. A text box is a field in which users can enter text (potentially, as much as 32K). By default, this field holds a single line of non-wrapping text. If one chooses a multi-line setting in the text box, this field will hold multiple lines of wrapping text.

LIST BOX: This adds a list box to a dialog box. A list box is a displayed, scrollable list from which the user can select one item.

COMBO BOX: This adds a combo box to a dialog box. A combo box consists of a text field with a displayed, scrollable list beneath it. Users can either select an item from the list or enter the name of the desired item in the field text. The currently selected item is displayed in the field text. If the item was selected from the scrolling list, it is highlighted there as well.

DROP LIST BOX: This adds a drop list box to a dialog box. A drop list box consists of a field that displays the current selected item, followed by a downward-pointing error which users can click to temporarily display a scrolling list of items. Once they select an item from the list, the list disappears and the newly selected item is displayed in the field.

PICTURE: This command adds a picture to a dialog box. A picture is a field used to display a windows bit map or metafile.

PICTURE BUTTON: This adds a picture button to a dialog box. A picture box is a special type of push, or command button on which a windows bit map or metafile appears.

PICT TOOL: This enables a programming to select, move, and resize, items that control the insert point.

The dialog editor of 516 can be considered to contain a pallet of functions, commands, and graphical elements which may be selected by a programmer in establishing the contents of a dialog which consists of one or more cascading or linked graphical user interfaces. The programmer utilizes the elements in the dialog editor in order to construct and edit a dialog.

The dialog controls module 514 is comparable to a dialog controls module present in the "rhythm" product sold by i2 Technologies, Inc. Assignee of the present application. This module allows one to connect structure boxes to dialog controls one has created utilizing the dialog editor 516. An exemplary screen from the dialog controls module 514 of FIG. 12 is depicted in FIG. 7. As is shown, a "NAME 601" field is provided which displays the name of the active structure box. Additionally, a "CODE FIELD 603" is provided which displays the code of a selected box. One can select another code from a drop down list. The boxes are listed in the same order as they appear in the structure. When a particular code is identified in Code Box 603, a grid 605 is displayed there below which displays all dialogs, controls and variables that have been earlier designated as being associated with the box or boxes. As shown in FIG. 7, a grid 605 includes a variable field 607, a dialog ID field 609 and a control field 611.

The same screen depicted in FIG. 7 also depicts a series of fields which identify dialogs. A dialog name Box 613 is provided which identifies a particular dialog. A dialog ID box 615 displays a dialog ID that one has entered for a dialog in the dialog manager. A dialog control box 617 displays the dialog controls that have been created utilizing the dialog editor 516 of FIG. 12.

As is shown in FIG. 7, a variety of control buttons are provided including an "OK" button, a "cancel button", "scrolling" buttons, a "variables" button which opens a variables dialog, a "clear" button which clears the PM variable from the selected control for the active box. An "add" button which can be utilized to add controls. A "delete" button which removes selected control from the active box, an "update" button which updates the active dialog and control as new ones in the grid, an "edit" button which opens the dialog manager dialog, a "show" button which displays the dialog with the box codes attached to the controls, and a "close" button which closes the show dialog.

An exemplary screen from the dialog manager 512 of FIG. 12 is depicted in the view of FIG. 8. This dialog manager is similar to the dialog manager present in the "RHYTHMS" product of i2 Technologies which is the Assignee of the present application. The exemplary dialog manager screen includes an ID field 651 which displays the ID of the active dialog. A drop down list may be provided to allow the selection of another dialog. It further includes a name field 653 which displays the name of the active dialog. It contains a controls field which displays a list of controls related to the active dialog. The controls are buttons, radio buttons, group boxes, etc.

A properties grid 657 is also provided which contains the values from the dialog editor established for graphical user interface elements. A plurality of control buttons are also provided in the view of FIG. 8. A programmer may create a new dialog by clicking the "ADD" button. The programmer may create a new dialog by clicking the "DLG EDITOR" button. The scrolling buttons are provided to allow backwards and forwards scrolling. A "SAVE" button is provided to allow the saving of a edited or newly created dialog. The "DELETE" button allows the deletion of an active dialog.

FIG. 13 is a table which identifies the primary values which are under the parameters control. A "CLASS" value cannot be edited. However, the X and Y coordinates may be edited. These X and Y coordinates establish an X and Y coordinate in pixels for a graphical user interface element.

The Y variable displays the width of the control element in pixels and the value H displays the height of the control element in pixels. The "TITLE" element is a field for displaying the title of the control. The "OPTION" group cannot be edited. The "TEXT" element identifies a default static control text. The "FONT" element establishes a font name, size, and style. The "MULTI-LINE" element identifies an edit control feature in which a multiple or single line text may be identified. The "RTF" and "RTF TOOLBAR" elements identify a text box that can contain RTF text (MICROSOFT'S rich text format). The "EXTENDED" element identifies a multi-select list box that includes a check box for items in that list box.

Determining the relative position of all of the elements in a graphical user interface is a relatively simply matter when the operating environment and language is suitable for relatively high-bandwidth communication. For example, graphical user interfaces encoded in C++ or JAVA are relatively easy to implement using the present invention. However, graphical user interfaces which utilize HTML are a little more complicated to implement since there is no X,Y (coordinate system) in an HTML environment. In accordance with one implementation of the present invention, the elements of a graphical user interface may be located in HTML tables which can be utilized to emulate an X, Y coordinate system and which can be utilized in real time to properly locate the user interface elements. When operating an HTML environment, the present invention allows an HTML page to resemble graphical interface layouts for alternative rendering engines such as C++ and JAVA, utilizing a single database. Accordingly, the present invention allows a single database to support multiple user interface environments so separate parallel databases need not be maintained.

Figure 14:
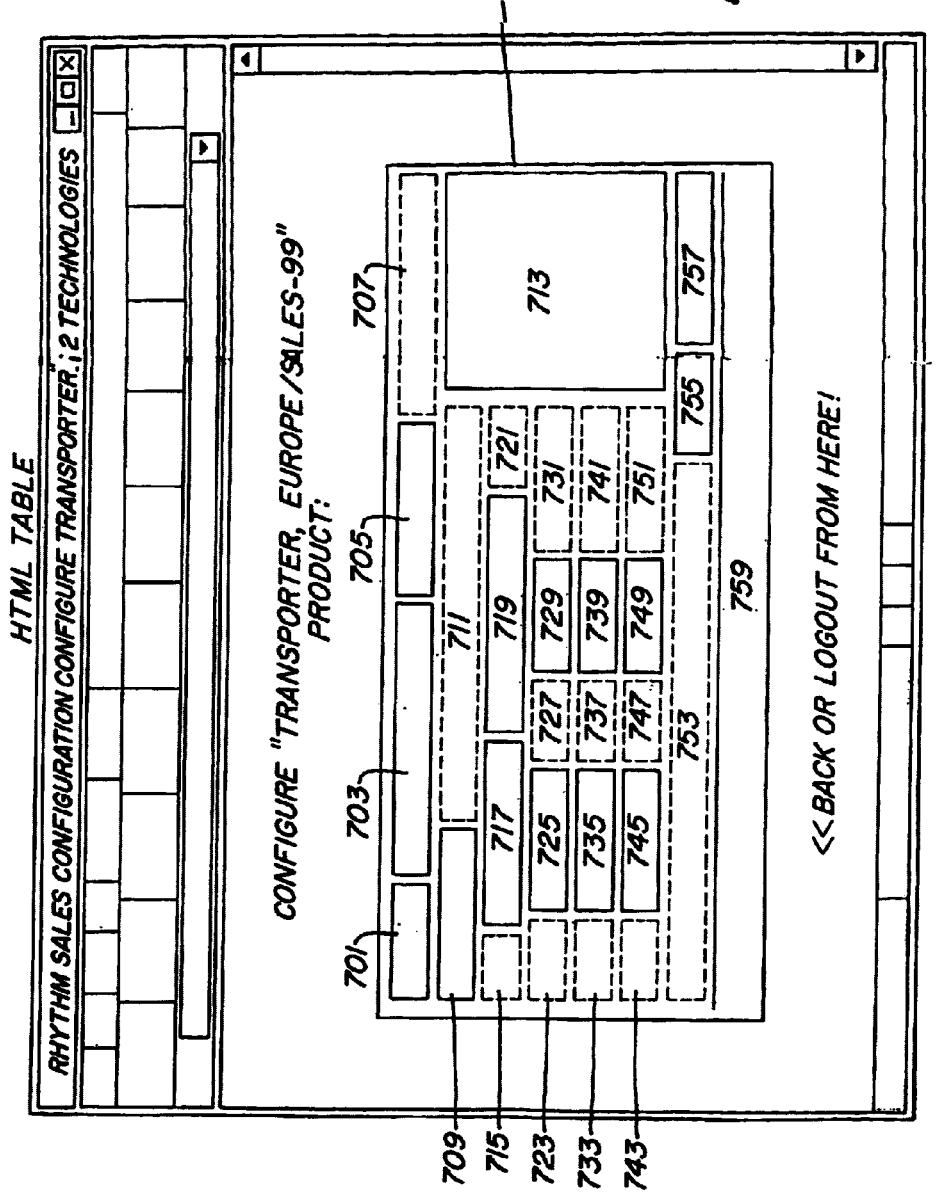
FIG. 14 is an example illustrating element layout in an HTML environment.

FIG. 14 is a pictorial representation of how elements in a graphical user interface in an HTML environment are laid-out in accordance with the preferred embodiment of the present invention. As is shown, HTML page 700 is divided up into segments which cover the entire space that is available. In the HTML format, this is considered to be a irregular table. The space within HTML page 700 will be accounted by a "cell" within the table even if there is no text or image provided in that particular portion of Page 700. In the view of FIG. 14, "cells" which do not contain any text or images are shown in dashed outlined form. Portions of the graphical interface which include text or images are shown in solid line form. The space within HTML page 700 may be divided up into rows. The first row is made up of cells 701, 703, 705, 707. Of these, cell 707 does not include any text or image portions. It is merely space which is not utilized. The cell 707 is utilized by the program in order to "account" for the space. The second row includes cells 709, 711, and the upper portion of cell 713. Cell 711 does not contain any text or images and is utilized merely to account for the space between cell 709 and cell 713. The third row is made up of cells 715, 717, 719, 721, and 713. Of these, cells 715, 721 are regions which do not contain any text or images and which are utilized only to account for the space in that row. The next row includes cells 723, 725, 727, 729, 731. Cells 725, 729 include text and/or images while cells 723, 727, 731 do not include any text or images and are merely utilized to account for the space in that row. This row also includes the portion of cell 713. The next row is made of cells 733, 735, 737, 739, 741, 713. Of these cells, cells 733, 737, 741 are not utilized for depicting any text or images and are merely utilized to account for the space in that row. The next row includes cells 743, 745, 747, 749, 751 and 713. Cells 745, 749, 713 include text and/or images. Cells 743, 747, 751 do not include text or images. The next row includes cells 753, 755, 757. Cells 755, 757 include text and/or images while cell 753 does not include any text or images. The final row, is made of cell 759.

Figure 15:
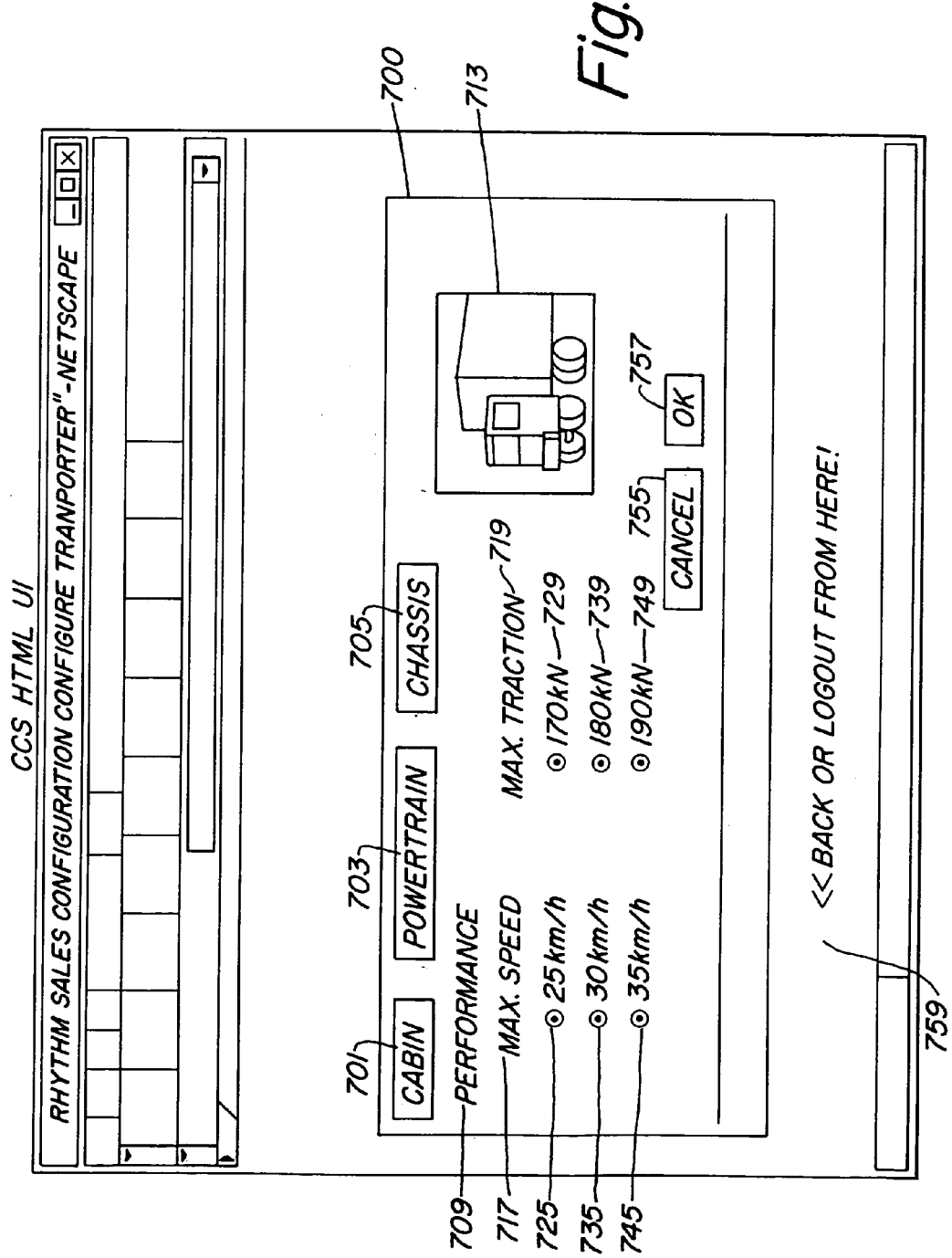
FIG. 15 depicts a populated HTML page in accordance with a preferred embodiment of the present invention.

FIG. 15 depicts HTML page 15 with cells populated with text and images in accordance with the Dialog Controls 514 and Dialog Manager 512 of FIG. 12. As is shown, cell 701, 703, 705 include textual material. Cell 713 includes a photo of the product. Cells 709, 717, 719 include textual material relating to product features. Cell 725, 735, 745, 729, 739, 749 include active areas which receive operator selections. Cell 755, 757 include buttons. Cell 759 includes scroll back and log out text. Examination of FIGS. 14 and 15 reveals that the table layout of HTML page 700 is useful for managing the relative position and size of the elements of the graphical user interface.

Figure 16:
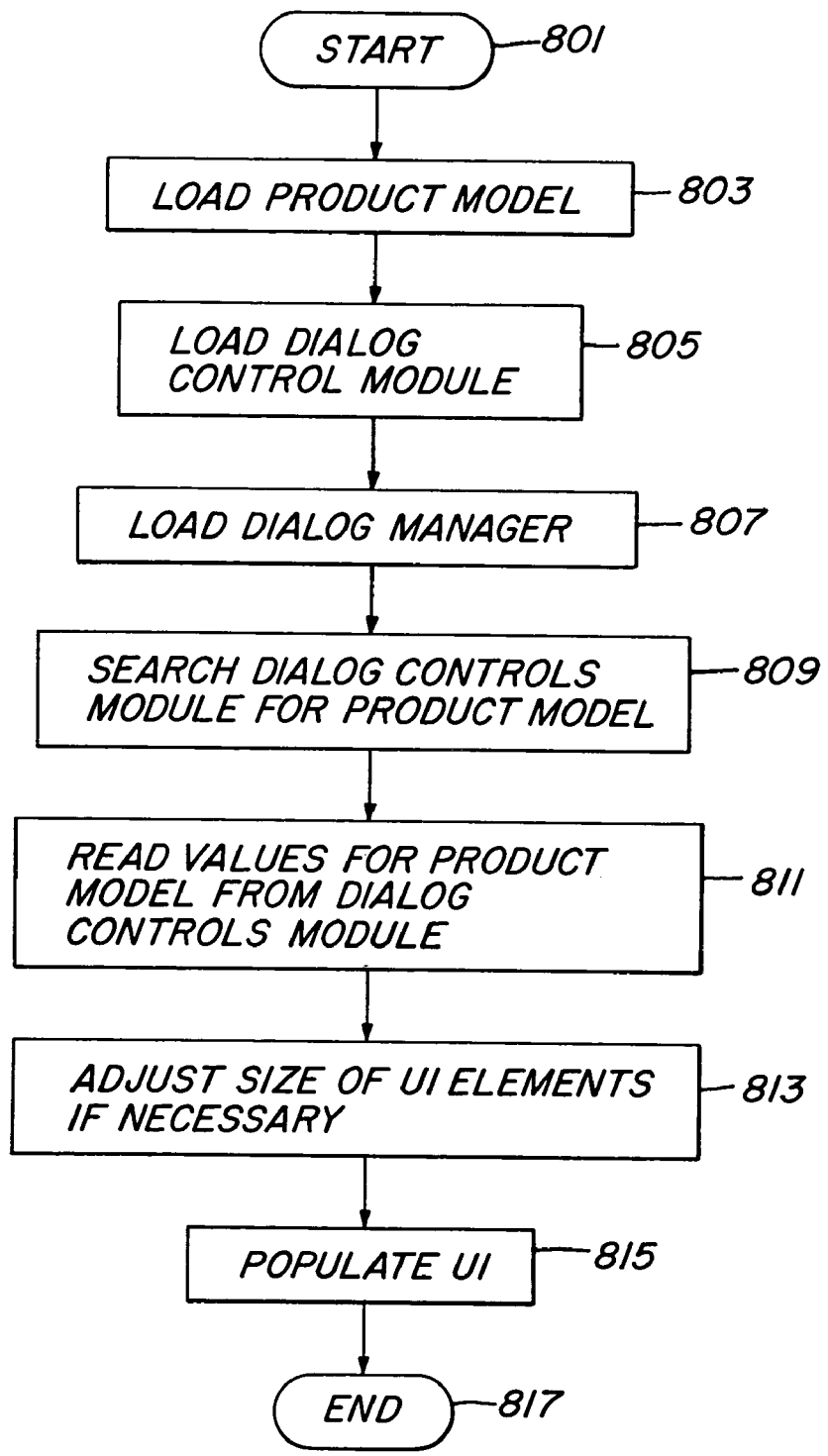
FIG. 16 is a flowchart illustrating an implementation of the preferred embodiment.

A routine which implements the preferred embodiment of the present invention is depicted in the flow chart of FIG. 16. The process starts at Block 801, and goes to Block 803, wherein the product model is loaded. Next, in accordance with Block 805, the Dialog Controls Module is loaded. Then, in accordance with Block 807, the Dialog Manager is loaded. Next, in accordance with Block 809, the Dialog Controls Module is searched for the particular product model. Once it is located, the values associated with that particular product model are read from the Dialog Controls Module. Then, in accordance with Block 813, the size of the user interface elements are adjusted if necessary in order to have the "cells" sized to an extent sufficient to carry all of the text and/or images which are to be posted in that particular portion of the HTML page. This can be best understood with reference again to FIG. 14. For the third row from the top, the text resident in cells 717, 719 may require a greater or lesser amount of space. If these cells need to be expanded, space that is not dedicated for some other purpose can be utilized. For example, cells 717, 721 may be further reduced in order to allow a greater amount of text or images to be posted to that portion of the HTML page 700. Sizing issues may become more complex if fonts sizes are changed for a particular graphical user interface. Changes in font size will necessitate recalculation of the available cell space and enlargement of the cells dedicated for text in order to accommodate the enlarged text.

Returning now to FIG. 16, once the user interface elements are adjusted in size, then the user interface is populated with its elements in accordance with Block 815 and the process ends at Block 817.

One principal advantage of the present invention is that existing databases can be utilized to populate on HTML pages which serve as graphical user interfaces. This can be done without creating any new or separate parallel database for the same types of data. The present invention can be applied to a wide variety of programming environments and programming languages. The basic concept is to utilize a single data base and multiple rendering engines in a controlled manner in order to enable the generation of generally similar or comparable graphical user interface environments which utilize that single data base to communicate with customers. In this manner, the customer may interact with a seller in one programming environment/language on one occasion, but in another programming environment/language on another occasion. In all locations, the graphical user interface screens which are presented to the user will be generally comparable in appearance. Furthermore, the data displayed on those pages will be identical since they are drawn or pulled from a single database.

A feature of the present invention is that it can also be applied to multiple sellers, as well as multiple buyers as described above. This would allow a flexible approach to commerce for complex e-commerce systems.

Although the invention has been described with reference to a particular embodiment, this description is not meant to be construed in a limiting sense. Various modifications of the disclosed embodiments as well as alternative embodiments of the invention will become apparent to persons skilled in the art upon reference to the description of the invention. It is therefore contemplated that the appended clams will cover any such modifications or embodiments that fall within the scope of the invention.

What is claimed is:

1. A system for communicating commercial transaction information between a Seller and a plurality of Buyers over a distributed data processing system, comprising:
    a single database for maintaining a plurality of user interface metadata elements including at least component identifications and component properties;
    a visual rule model for configuring a plurality of graphical user interface dialog pages utilizing the metadata and a plurality of dialog rules;
    a plurality of rendering engines each adapted to respond to commands from the visual rule model and each further operable to construct a plurality of graphical user interface screens in a different language; and
    a dialog manager operable to select one of the plurality of rendering engines for each Buyer based on a bandwidth of the Buyer's communication channel and further operable to pass at least the metadata elements to the selected rendering engine in order to dynamically construct a plurality of graphical user interface screens in the distributed data processing systems in order to allow the communication of information between the Seller and the plurality of Buyers necessary related to a potential commercial transaction.

2. The system of claim 1, wherein the language of one rendering engine comprises hyper-text mark-up language.

3. The system according to claim 1, wherein one communication channel comprises a relatively low bandwidth communication channel.

4. The system of claim 3, wherein the relatively low bandwidth communication channel comprises an Internet connection.

5. A method of conducting computer-moderated commercial transactions, comprising:
    providing a single database which contains product metadata relating to objects of computer-moderated commerce;
    providing a plurality of alternative rendering engines for constructing a plurality of graphical user interface screens relating to the objects of computer-moderated commerce;
    providing a dialog manager which can be utilized to provide commands to the plurality of alternative rendering engines;
    establishing a relatively low bandwidth communication channel with a customer;
    selecting one of the plurality of rendering engines based on the bandwidth of the customer's communication channel; and
    during interaction with the customer in a computer-moderated commercial transaction, utilizing the dialog manager to pass the product metadata from the single database to the selected rendering engine to dynamically construct a series of graphical user interface screens which include active and passive portions for presenting a plurality of product options to the customer and to record the customer's selection.

6. The method of claim 5, wherein one of the plurality of rendering engines comprises a hyper-text mark-up rendering engine.

7. The method of claim 5, wherein the relatively low bandwidth communication channel comprises an Internet connection.

8. A method of conducting a computer-moderated commercial transaction between a Seller and a Buyer, comprising:
    providing a distributed data processing system including a relatively low-bandwidth communication channel between the Seller and Buyer;
    providing a single database under the control of the Seller which contains metadata related to the subject of the commercial transaction;
    providing a plurality of alternative rendering engines each of which is responsive to rendering commands which is in a different programming language;
    providing a dialog manager program under the control of the Seller which moderates the passing of metadata and rendered objects over the distributed data processing system to the Buyer in the form of graphical user interface screens;
    selecting one of the plurality of rendering engines based on the bandwidth of the communications channel;
    passing transaction information to the Buyer over the relatively low-bandwidth communication channel of the distributed data processing system in the form of graphical user interface screens which confine particular relevant portions of the metadata and the output of the selected rendering engine; and
    receiving transaction selections from the Buyer over the relatively low-bandwidth communication channel of the distributed data processing system through monitoring of interaction between the Buyer and the graphical user interface screens.

9. The method of claim 8, wherein the relatively low-bandwidth communication channel comprises an Internet connection.

10. The method of claim 8, wherein one of the programming languages comprises a hyper-text mark-up language.

11. Software for computer-moderated commercial transactions, the software embodied in computer-readable media and when executed operable to:
    provide a single database which contains product metadata relating to objects of computer-moderated commerce;
    provide a plurality of alternative rendering engines for constructing a plurality of graphical user interface screens relating to the objects of computer-moderated commerce;
    provide a dialog manager which can be utilized to provide commands to the plurality of alternative rendering engines;
    establish a relatively low bandwidth communication channel with a customer;
    select one of the plurality of rendering engines based on the bandwidth of the customer's communication channel; and
    during interaction with the customer in a computer-moderated commercial transaction, utilize the dialog manager to pass the product metadata from the single database to the selected rendering engine to dynamically construct a series of graphical user interface screens which include active and passive portions for presenting a plurality of product options to the customer and to record the customer's selection.

12. The software of claim 11, wherein one of the plurality of rendering engines comprises a hyper-text mark-up rendering engine.

13. The software of claim 11, wherein the relatively low bandwidth communication channel comprises an Internet connection.

14. A system for computer-moderated commercial transactions, comprising:

means for providing a single database which contains product metadata relating to objects of computer-moderated commerce;

means for providing a plurality of alternative rendering engines for constructing a plurality of graphical user interface screens relating to the objects of computer-moderated commerce;

means for providing a dialog manager which can be utilized to provide commands to the plurality of alternative rendering engines;

means for establishing a relatively low bandwidth communication channel with a customer;

means for selecting one of the plurality of rendering engines based on the bandwidth of the customer's communication channel; and means for, during interaction with the customer in a computer-moderated commercial transaction, utilizing the dialog manager to pass the product metadata from the single database to the selected rendering engine to dynamically construct a series of graphical user interface screens which include active and passive portions for presenting a plurality of product options to the customer and to record the customer's selection.

15. The system of claim 14, wherein one of the plurality of rendering engines comprises a hyper-text mark-up rendering engine.

16. The system of claim 14, wherein the relatively low bandwidth communication channel comprises an Internet connection.

* * * * *